(12) United States Patent
Taylor et al.

(10) Patent No.: US 12,518,035 B2
(45) Date of Patent: Jan. 6, 2026

(54) PROCESSING SECURE CONTENT ON A VIRTUAL REALITY SYSTEM

(71) Applicant: Magic Leap, Inc., Plantation, FL (US)

(72) Inventors: Robert Blake Taylor, Porter Ranch, CA (US); Dmitry Pastouchenko, Folsom, CA (US); Frederic Plourde, Saint-Eustache (CA)

(73) Assignee: Magic Leap, Inc., Plantation, FL (US)

( * ) Notice: Subject to any disclaimer, the term of this patent is extended or adjusted under 35 U.S.C. 154(b) by 173 days.

(21) Appl. No.: 18/380,099

(22) Filed: Oct. 13, 2023

(65) Prior Publication Data
US 2024/0054241 A1 Feb. 15, 2024

Related U.S. Application Data

(63) Continuation of application No. 17/238,716, filed on Apr. 23, 2021, now Pat. No. 11,829,497.

(60) Provisional application No. 63/014,645, filed on Apr. 23, 2020.

(51) Int. Cl.
G06F 21/62 (2013.01)
G06F 3/14 (2006.01)
G06F 21/10 (2013.01)
G06F 21/60 (2013.01)
G06F 21/84 (2013.01)

(52) U.S. Cl.
CPC ............ *G06F 21/6209* (2013.01); *G06F 3/14* (2013.01); *G06F 21/10* (2013.01); *G06F 21/602* (2013.01); *G06F 21/84* (2013.01)

(58) Field of Classification Search
CPC .... G06F 21/6209; G06F 21/10; G06F 21/602; G06F 21/84; G06F 3/14; G06F 3/147; G09G 2340/14; G09G 2354/00; G09G 2358/00; G09G 5/026
See application file for complete search history.

(56) References Cited

U.S. PATENT DOCUMENTS

| 8,918,867 | B1 | 12/2014 | Salour |
| 11,829,497 | B2 | 11/2023 | Taylor et al. |
| 2005/0097341 | A1 | 5/2005 | Francis et al. |
| 2010/0295827 | A1 | 11/2010 | Lim et al. |
| 2016/0072774 | A1 | 3/2016 | McRae |
| 2016/0275270 | A1 | 9/2016 | Bostick et al. |

(Continued)

FOREIGN PATENT DOCUMENTS

JP 2015188133 A 10/2015

OTHER PUBLICATIONS

JP2022-563940, "Notice of Allowance", May 14, 2024, 3 pages. [no translation available].

(Continued)

*Primary Examiner* — Sangseok Park
(74) *Attorney, Agent, or Firm* — KILPATRICK TOWNSEND & STOCKTON LLP

(57) ABSTRACT

Described herein are techniques and technologies to identify an encrypted content within a field of view of a user of a VR/AR system and process the encrypted content appropriately. The user of the VR/AR technology may have protected content in a field of view of the user. Encrypted content is mapped to one or more protected surfaces on a display device. Contents mapped to a protected surface may be rendered on the display device but prevented from being replicated from the display device.

20 Claims, 11 Drawing Sheets

(56) References Cited

U.S. PATENT DOCUMENTS

| | | | |
|---|---|---|---|
| 2017/0161506 A1* | 6/2017 | Gates | ........................ G09C 5/00 |
| 2017/0337359 A1* | 11/2017 | Hook | ...................... G06F 21/14 |
| 2018/0091856 A1 | 3/2018 | Ayers | |
| 2019/0020907 A1 | 1/2019 | Kiefer et al. | |
| 2019/0065790 A1 | 2/2019 | Jones | |
| 2020/0081527 A1 | 3/2020 | Agaoglu et al. | |

OTHER PUBLICATIONS

U.S. Appl. No. 17/238,716, "Advisory Action", Apr. 17, 2023, 4 pages.
U.S. Appl. No. 17/238,716, "Final Office Action", Feb. 2, 2023, 24 pages.
U.S. Appl. No. 17/238,716, "Non-Final Office Action", Jul. 15, 2022, 20 pages.
U.S. Appl. No. 17/238,716, "Notice of Allowance", Jul. 18, 2023, 8 pages.
EP21793057.7, "Extended European Search Report", Sep. 6, 2023, 7 pages.
PCT/US2021/028842, "International Preliminary Report on Patentability", Nov. 3, 2022, 6 pages.
PCT/US2021/028842, "International Search Report and Written Opinion", Aug. 3, 2021, 7 pages.
EP21793057.7, "Office Action", Mar. 31, 2025, 5 pages.
Jp2024-94289, "Office Action and English translation", May 16, 2025, 5 pages.
CN202180030206.7, "Office Action and English translation", Jul. 31, 2025, 18 pages.

* cited by examiner

PROCESSING SECURE CONTENT ON A VIRTUAL REALITY SYSTEM

CROSS-REFERENCES TO RELATED APPLICATIONS

This application is a continuation of U.S. application Ser. No. 17/238,716, filed Apr. 23, 2021, U.S. Pat. No. 11,829,497, issued Nov. 28, 2023, entitled "PROCESSING SECURE CONTENT ON A VIRTUAL REALITY SYSTEM," which claims the benefit of priority to U.S. Provisional Patent Application No. 63/014,645, filed Apr. 23, 2020, entitled "PROCESSING SECURE CONTENT ON A VIRTUAL REALITY SYSTEM," the entire contents of which is hereby incorporated by reference for all purposes.

BACKGROUND

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Mixed reality (e.g., VR or AR) scenarios often include presentation of virtual content (e.g., color images and sound) corresponding to virtual objects in relationship to real-world objects. For example, a user of a VR/AR technology may be in a real-world, physical, room-like setting featuring furniture, windows, a computer screen provided on a table top, and a television. In addition to these items, the user of the VR/AR technology also perceives that they "see" virtual objects that do not exist in the real-world. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

According to various embodiments, the user of the VR/AR technology may have protected content (e.g. paid programming provided on the television in the above real-world room setting example) in a field of view of the user. Such protected (e.g. encrypted) content should not be allowed to be replicated (e.g. recorded, stored or distributed) from the display device of the AR technology. Current VR/AR techniques do not allow for protecting the encrypted content on the display device.

SUMMARY

Described herein are techniques and technologies to identify an encrypted content within a field of view of a user of a VR/AR system and process the encrypted content appropriately.

According to various embodiments, the user of a VR/AR technology may have protected content (e.g. paid programming provided on the television) in a field of view of the user. Such protected (e.g. encrypted) content should may be protected while displayed on the display device of the VR/AR technology. For example, while the encrypted content may be rendered on the display device, the encrypted content is prevented from being replicated (e.g. recorded, stored or distributed) from the display device. Embodiments provide techniques for displaying the encrypted content in a protected manner on the display device. For example, embodiments allow for mapping content to one or more protected surfaces on a display device when the system identifies an encrypted content within the field of view of the user. Content mapped to one or more protected surfaces may be rendered on the display device and prevented from being replicated from the display device.

Embodiments provide a method for displaying content components on a display device. The method comprises receiving, by a processing platform, a plurality of content components. The method also includes identifying, by the processing platform, an encrypted content component among the plurality of content components. The processing platform transmits the encrypted content component to the display device. At least the encrypted content component is mapped to a protected surface.

Various embodiments provide a processing platform comprising one or more processors; and one or more storage devices storing instructions that, when executed on the one or more processors, cause the one or more processors to: receive a plurality of content components, identify an encrypted content component among the plurality of content components, and transmit the encrypted content component to a display device. At least the encrypted content component is mapped to a protected surface.

Embodiments further provide a system including a processing platform, a first source configured to provide an unencrypted content component, a second source configured to provide an encrypted content component; and a display device configured to display at least the encrypted content component on a protected surface. The processing platform includes one or more processors; and one or more storage devices storing instructions that, when executed on the one or more processors, cause the one or more processors to: receive a plurality of content components, identify the encrypted content component among the plurality of content components, and transmit the encrypted content component to the display device. At least the encrypted content component is mapped to the protected surface.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Figure 1A:
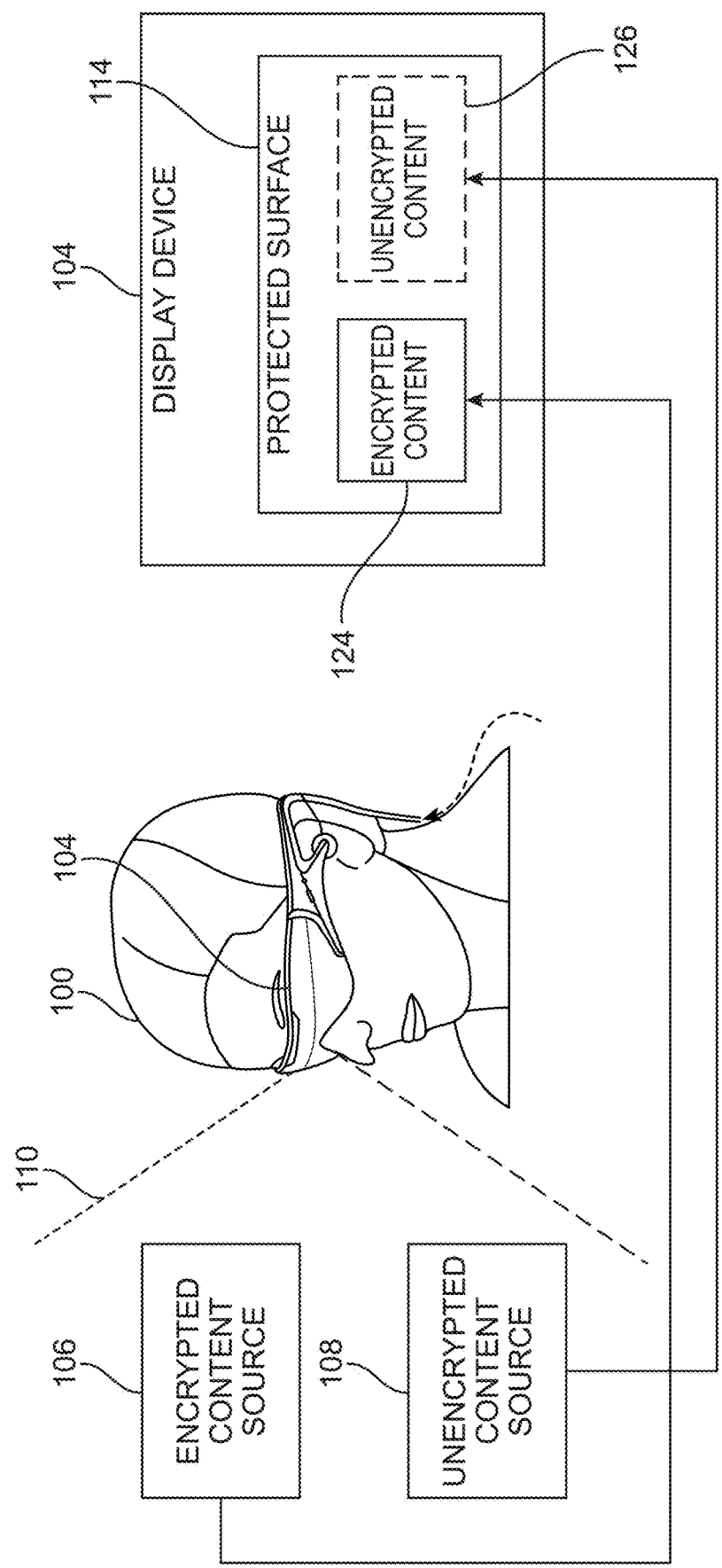
FIG. 1A illustrates an embodiment for rendering encrypted content and unencrypted content on a protected surface of a display device, according to some embodiments.

Embodiments provide systems, methods, and articles of manufacture for displaying encrypted content on a protected surface on a virtual reality (VR) or an augmented reality (AR) display device. The encrypted content may be provided by an encrypted content source (e.g. source providing encrypted content). Content mapped to a protected surface may be rendered on the display device and prevented from being replicated (e.g. recorded, stored, shared or live streamed on social media) from the display device.

In some embodiments, the encrypted content (e.g. protected data) may not be accessed from a central processing unit (CPU) of a content processing platform. Under a protected mode, it is possible to read from both protected and unprotected surfaces. However, it is only possible to write out to the protected surfaces. Accordingly, while the encrypted content is rendered on the AR display device, the encrypted content is prevented from being accessed, shared, stored and/or recorded.

In some embodiments, a secondary source (e.g. an unencrypted content source) may provide unencrypted content. When there is only unencrypted content, the content may be displayed on an unprotected surface on the display device. The content rendered on an unprotected surface can be stored, replicated, or shared. In some embodiments, when a graphics processing platform receives both encrypted content and unencrypted content, the contents are displayed on a protected surface on the display device due to the presence of the encrypted content. That is, on a recording made from the display device, the protected surface may be displayed only as a contour (e.g. an empty rectangle) while content mapped to the unprotected surface may be displayed on the recording. Thus, embodiments allow keeping the encrypted nature of protected content on an AR experience.

In some embodiments, when the graphics processing platform receives both encrypted content and unencrypted content, the content processing platform may be configured to map encrypted content to a protected surface and map the unencrypted content to an unprotected surface on the display device.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

FIG. 1A illustrates an embodiment for rendering encrypted content and unencrypted content on a protected surface of a display device, according to some embodiments. A user 100 may be wearing an AR headpiece including a display device 104. There may be an encrypted content source 106 providing encrypted content and an unencrypted content source 108 providing unencrypted content in a field of view 110 of the user 100. In some embodiments, the encrypted content source 106 may include a television providing subscription-based programming, and the unencrypted content source 108 may include a gaming console displaying a desktop game.

A content processing platform receiving the inputs from the encrypted content source 106 and the unencrypted content source 108 may identify the encrypted content component and determine that all inputs (both the encrypted content and the unencrypted content) is to be displayed on a protected surface on the display device 104. The contents of the protected surface displayed on the display device 104 may be rendered on the display device and prevented from being replicated from the display device. For example, if the content displayed on the display device is recorded, the protected content may be recorded as an empty box, showing merely a contour of the box without rendering the content of the protected surface on the stored copy. One of ordinary skill in the art will appreciate that the protected content may be protected in any other suitable manner (e.g. scrambled picture, distorted picture, redacted content, using alternative images, etc.).

The content processing platform may generate one or more protected surfaces 114, and may map an encrypted content component 124 and an unencrypted content component 126 to the protected surface(s) 114. The content processing platform may then transmit the protected surface(s) 114 as well as the encrypted content component 124 and the unencrypted content component 126 to the display device 104. In some embodiments, only encrypted content component 124 may be present within the field of view 110 of the user 100 (e.g. there may be no unencrypted content component 126). As long as the encrypted content component 124 is within the field of view 110 of the user 100, only the protected surface(s) 114 is displayed on the display device 104. Accordingly, all content may be rendered on the display device 104 and prevented from being recorded, stored or otherwise replicated from the display device 104.

When the user 100 turns their gaze toward the unencrypted content source providing the unencrypted content (e.g. the desktop game), such that the encrypted content source is no longer in the field of view 110, the unencrypted content will be displayed on an unprotected surface of the display device 104. That is, when the encrypted content is no longer within the field of view 110 of the user 100, the input provided to the content processing platform only includes the unencrypted content. This is illustrated in FIG. 1B.

Figure 1B:
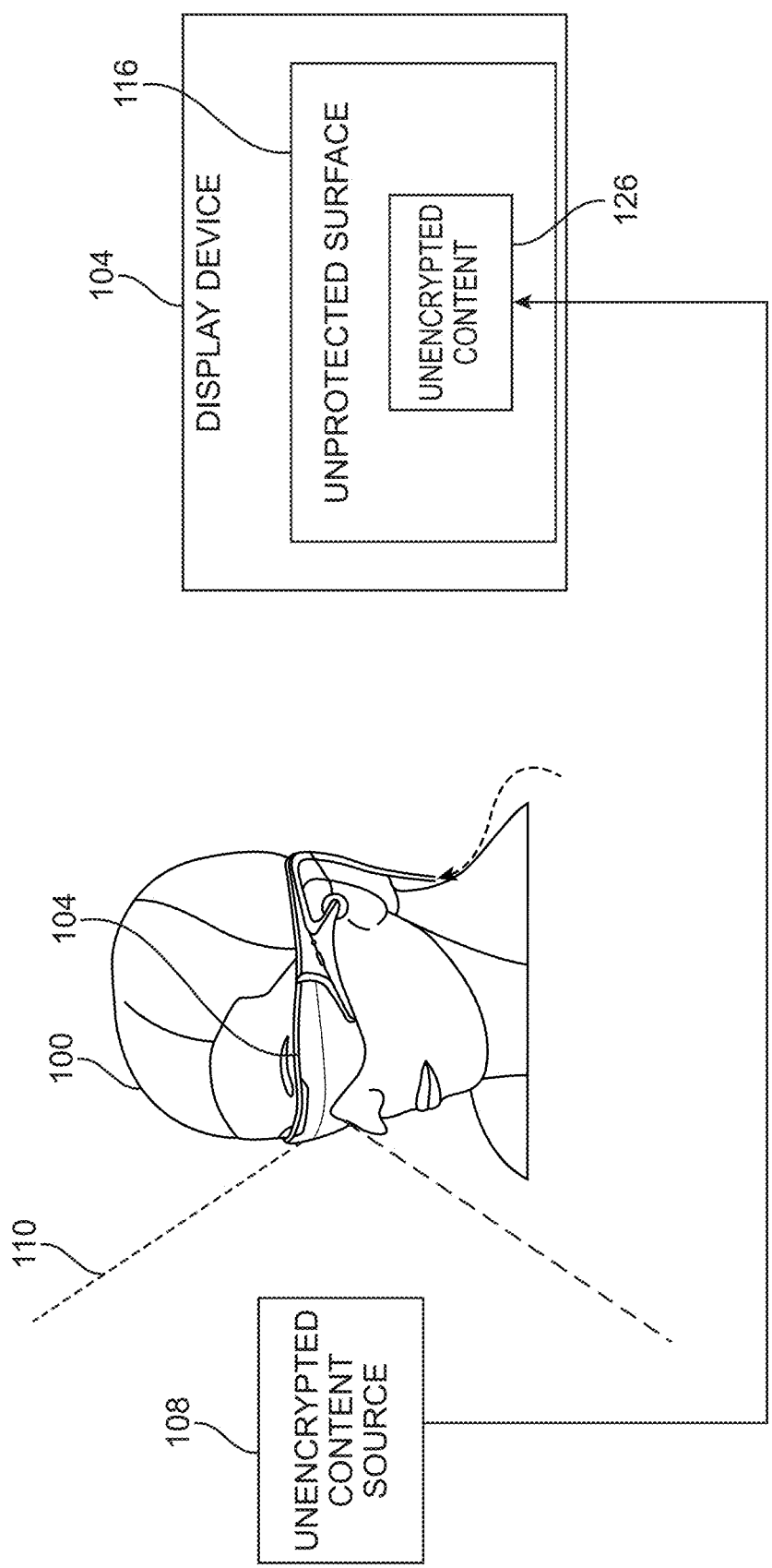
FIG. 1B illustrates an embodiment for rendering unencrypted content on an unprotected surface of a display device, according to some embodiments.

FIG. 1B illustrates an exemplary embodiment for rendering unencrypted content on an unprotected surface of a display device according to exemplary embodiments of the present invention. The processing platform may generate one or more unprotected surfaces 116, and may map the unencrypted content component 126 to the unprotected surface(s) 116. The processing platform may then transmit the unprotected surface(s) 116 as well as the unencrypted content component 126 to the display device 104. The unencrypted content component 126 may be rendered on the display device 104 and may be recorded, stored or otherwise replicated from the display device 104.

Figure 1C:
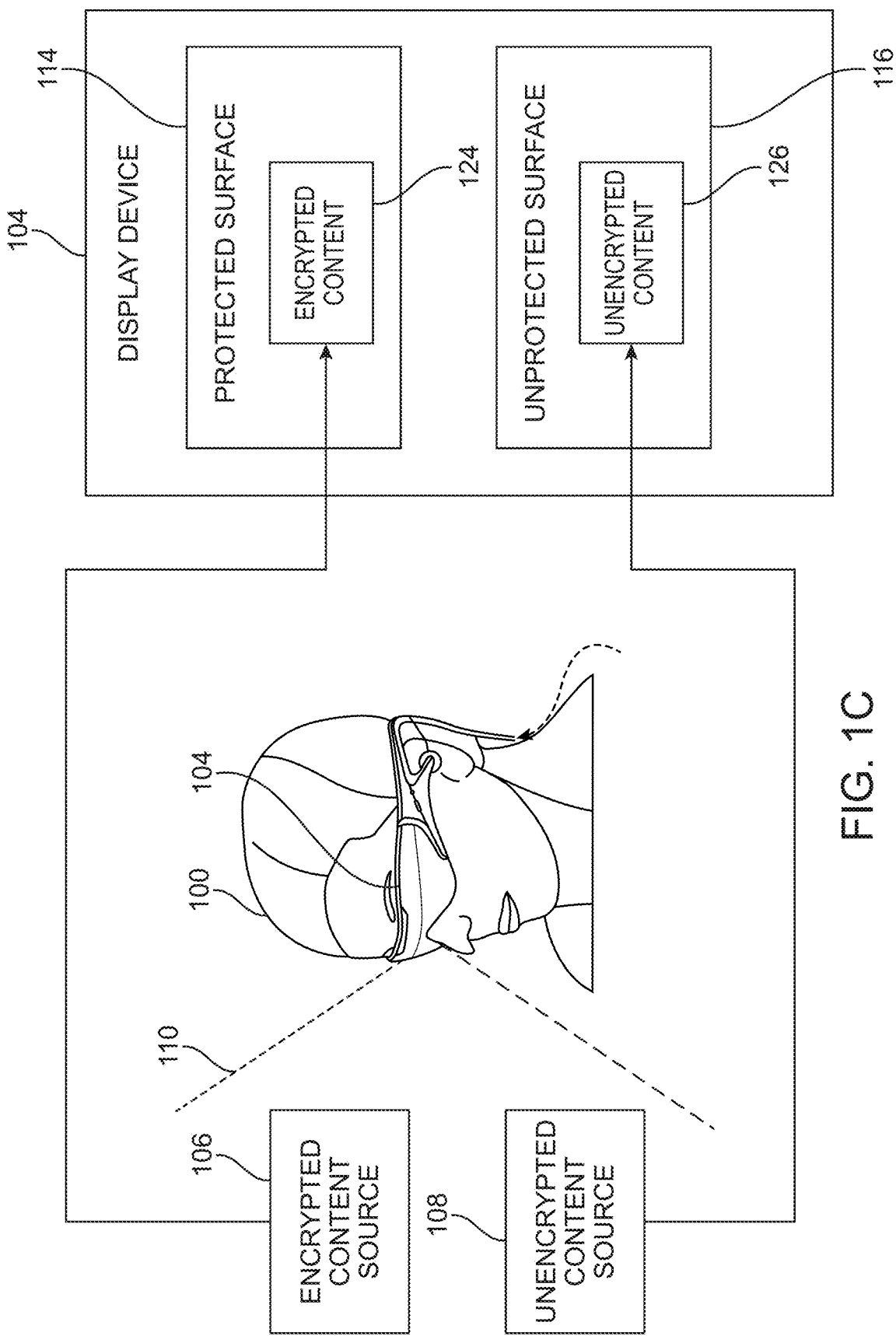
FIG. 1C illustrates an embodiment for rendering encrypted content on a protected surface and unencrypted content on an unprotected surface of a display device, according to some embodiments.

FIG. 1C illustrates another exemplary embodiment for rendering encrypted content on a protected surface and unencrypted content on an unprotected surface of a display device according to exemplary embodiments of the present invention. According to various embodiments, when both the encrypted content component 124 and the unencrypted content component 126 are within the field of view 110 of the user 100, it may be possible to generate protected and unprotected surfaces, and map the encrypted content component 124 to the protected surface 114, and map the unencrypted content component 126 to the unprotected surface 116. Accordingly, while both the encrypted content component 124 and the unencrypted content component 126 are rendered on the display device 104, only unencrypted content component 126 may be replicated (e.g. stored, recorded or shared) from the display device 104. According to various embodiments, a recording generated from the display device 104 may include the unencrypted content component 126 and merely a box contour to represent the protected surface 114 without showing what is rendered in the protected surface 114.

For example, in the above example where the user views the encrypted content source (e.g. the television) and the unencrypted content source (e.g. the desktop game) at the same time, the subscription-based programming may be mapped to a protected surface on the display device, and the desktop game may be mapped to an unprotected surface on the display device. A recording made from the display device (e.g. a social media post from the display device, live feed from the display device) may illustrate the desktop game while the subscription-based programming provided by the television is not displayed (e.g. only a box representing the television is provided on the recording).

Regardless of the specifics of the embodiments discussed above in connection with FIGS. 1A-1C, the encrypted content component is prevented from being mapped to and replicated from an unprotected surface on the display device.

Figure 2A:
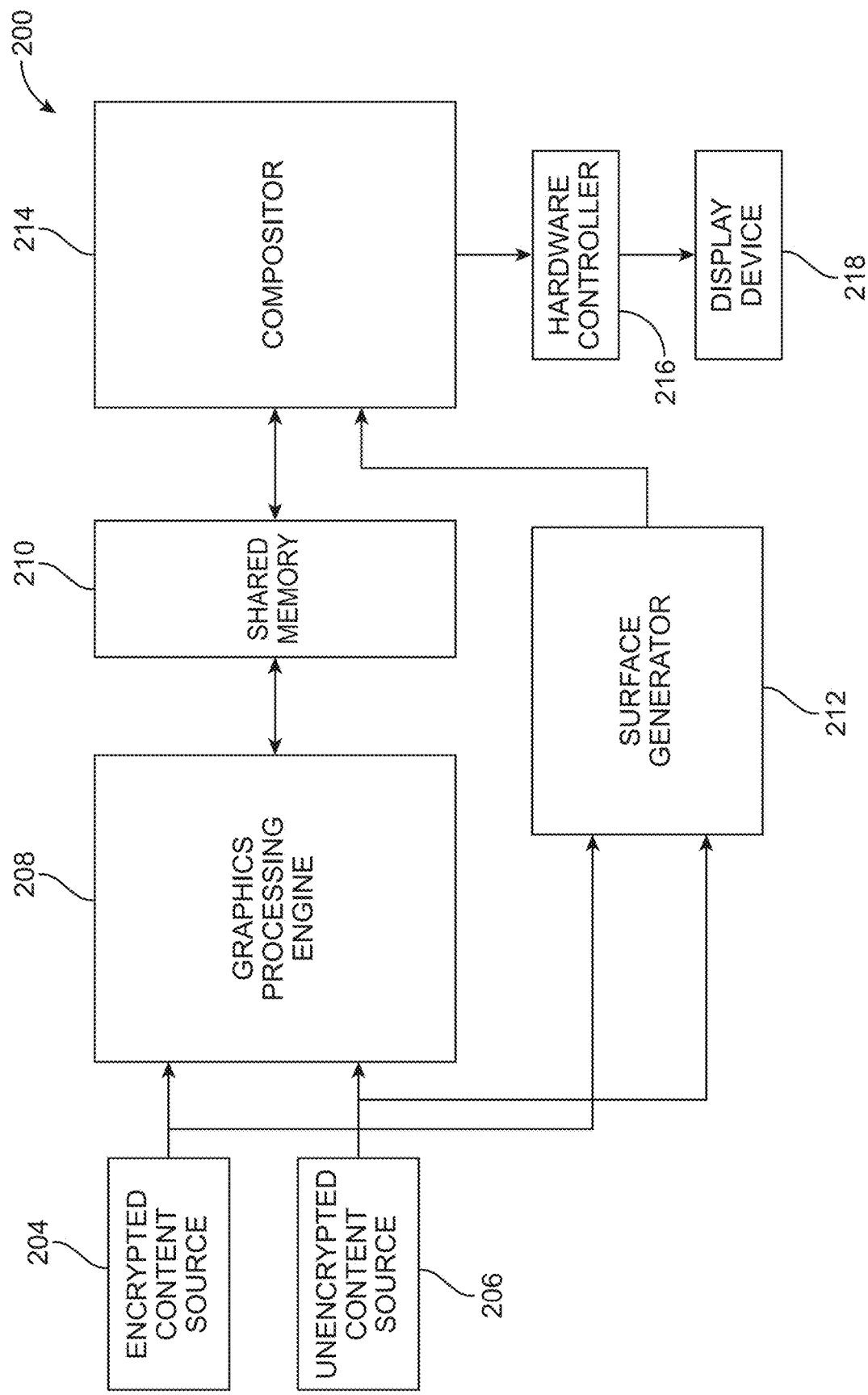
FIG. 2A illustrates a block diagram illustrating a content processing platform, according to some embodiments.

As described above, the processing platform 200 may be configured to process content for displaying on a display device. FIG. 2A illustrates a simplified exemplary block diagram illustrating the processing platform 200 according to exemplary embodiments of the present invention. The exemplary processing platform 200 may include an encrypted content source 204, an unencrypted content source 206, a graphics processing engine 208, a shared memory 210, a surface generator 212, a compositor 214, a hardware controller 216 and a display device 218, among other elements.

The graphic processing engine 208 may receive input (e.g. content components such as audio content, video content, textual content, etc.) from the encrypted content source 204 and the unencrypted content source 206. The graphics processing engine 208 may pass the received content components to the shared memory 210.

The content components from the encrypted content source 204 and the unencrypted content source 206 may also be provided to a surface generator 212. The surface generator 212 may generate one or more protected surfaces and/or one or more unprotected surfaces. The surface generator 212 may pass the generated protected and/or unprotected surface(s) to the compositor 214.

The compositor 214 may receive the content components from the shared memory 210. The compositor 214 may also receive the generated protected and/or unprotected surface(s) from the surface generator 212. The compositor 214 may determine whether the received content component is encrypted (e.g. protected) or unencrypted (e.g. unprotected). For example, the compositor 214 may determine the encryption status of the content component based on the source providing the content component, and/or an identifier associated with the content component.

For embodiments where the presence of encrypted content component results in all content being mapped to protected surfaces (e.g. as discussed above in connection with FIG. 1A), the compositor 214 may combine the encrypted content component and the unencrypted content component into a single frame and may map the single frame to one or more protected surfaces. The compositor 214 may then pass the single frame and the one or more protected surfaces to the hardware controller 216. The hardware controller 216 may transmit the single frame (including the received encrypted and unencrypted content components) and the one or more protected surfaces to the display device 218. The display device 218 displays the single frame on the protected surface, such that as long as encrypted content component is present in the received input, the output displayed on the display device 218 cannot be replicated from the display device 218. Accordingly, the encrypted content cannot be shared, recorded, stored or otherwise accessed from the display device 218 or the processing platform in general.

When the user modifies their field of view to only include unencrypted content, the compositor 214 will determine the content component retrieved from the shared memory 210 as the unencrypted content component. The compositor 214 may also receive the generated unprotected surface(s) from the surface generator 212. For embodiments where there is only unencrypted content component (e.g. as discussed above in connection with FIG. 1B), the compositor 214 may map the unencrypted content component to one or more unprotected surfaces. The compositor 214 may then pass the unencrypted content component and the one or more unprotected surfaces to the hardware controller 216. The hardware controller 216 may transmit the unencrypted content component and the one or more unprotected surfaces to the display device 218. The display device 218 displays unencrypted content on the unprotected surface. The unencrypted content can be replicated, shared, recorded, stored or otherwise accessed from the display device 218 or the processing platform in general.

In some embodiments (e.g. as discussed above in connection with FIG. 1C), the compositor 214 may be configured to map the encrypted content component to the one or more protected surfaces and map the unencrypted content component to the one or more unprotected surfaces. The compositor 214 may then merge the encrypted content component and the unencrypted content component to a single frame, and pass the single frame (along with the surfaces and the mapping information) to the hardware controller 216.

As illustrated in FIG. 2A, there may not be a direct link between the sources and the hardware controller 216. The hardware controller 216 only receives input from the compositor 214 for transmitting to the display device 218. The hardware controller 216 may transmit the single frame (along with the surfaces and the mapping information) to the display device 218. The display device 218 displays the encrypted content on the one or more protected surfaces and displays the unencrypted content on the one or more unprotected surfaces. Accordingly, while the encrypted content cannot be replicated, recorded, stored or otherwise accessed from the display device 218, the unencrypted content can be freely replicated.

Figure 2B:
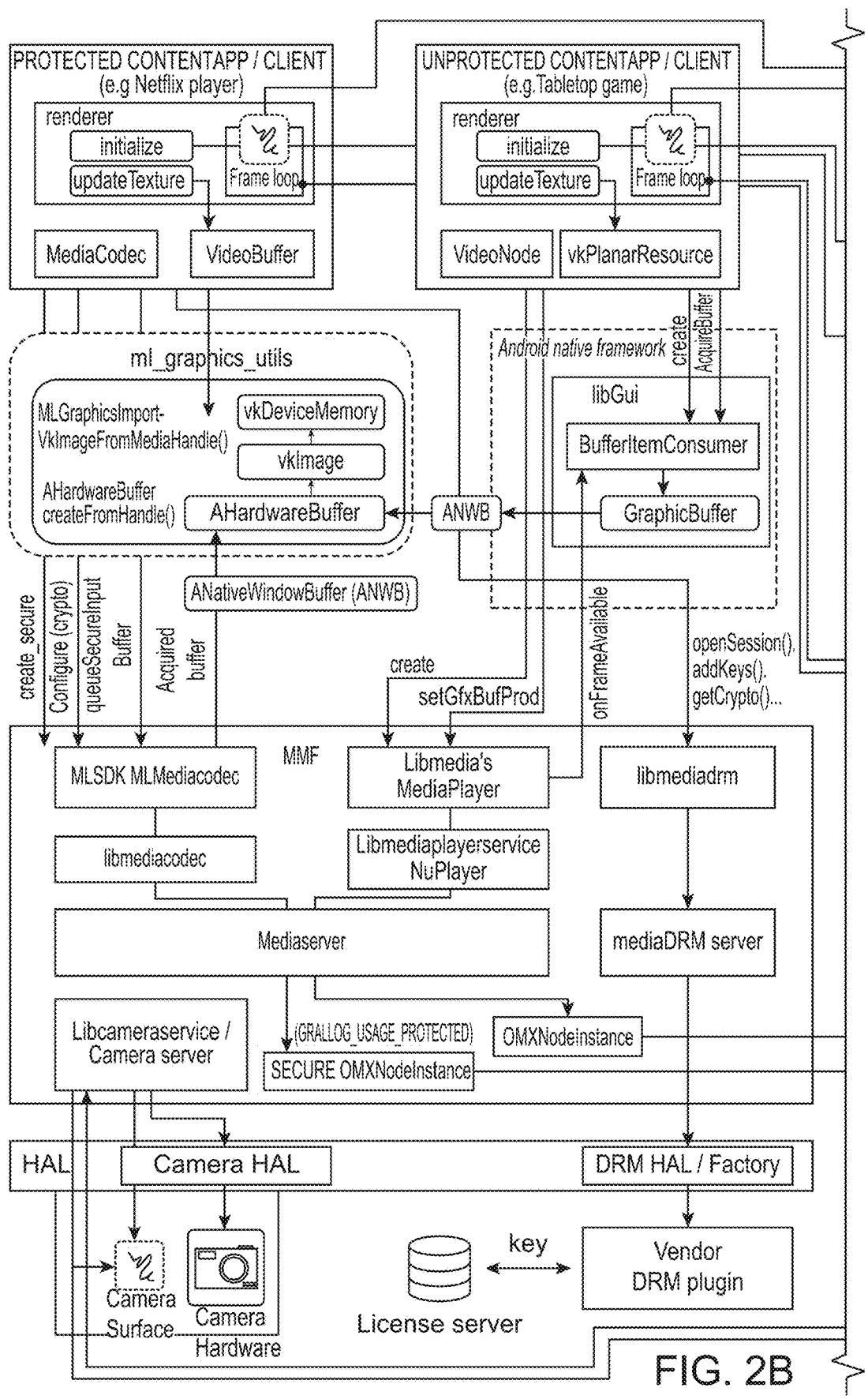
FIG. 2B illustrates a block diagram illustrating a content processing platform, according to some embodiments.
Figure 2B:
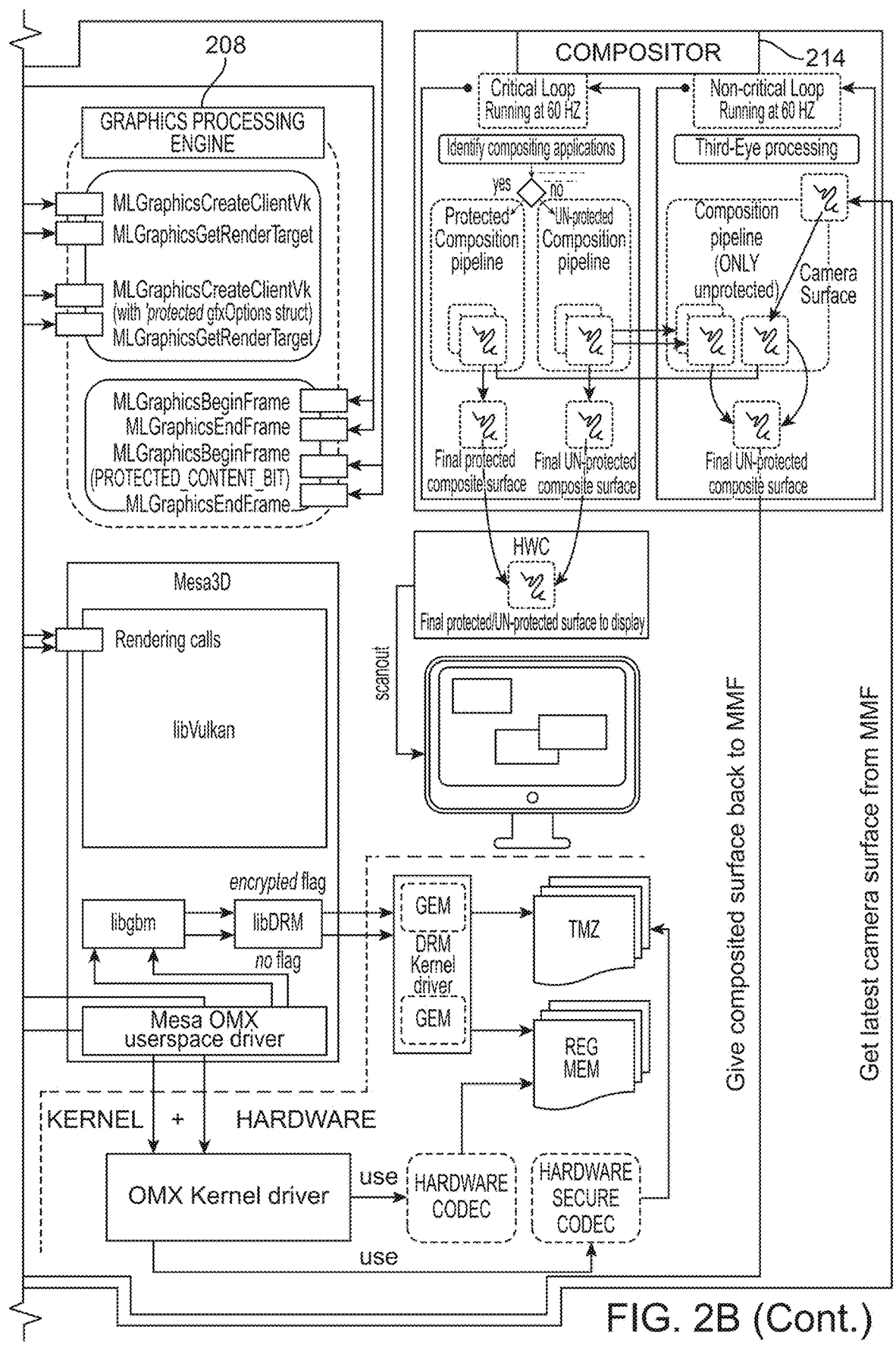

FIG. 2B illustrates a detailed exemplary block diagram illustrating the processing platform according to exemplary embodiments of the present invention. As illustrated in 2B, the graphics processing engine may generate a frame loop for each of the received content components. The graphics processing engine may generate an encrypted frame loop including the encrypted start frame, encrypted rendering, and encrypted end frame for the encrypted content component. The graphics processing engine may also generate an unencrypted frame loop including the unencrypted start frame, unencrypted rendering, and unencrypted end frame for the unencrypted content component. The graphics processing engine may transmit the frame loops to the compositor for further processing.

Figure 3A:
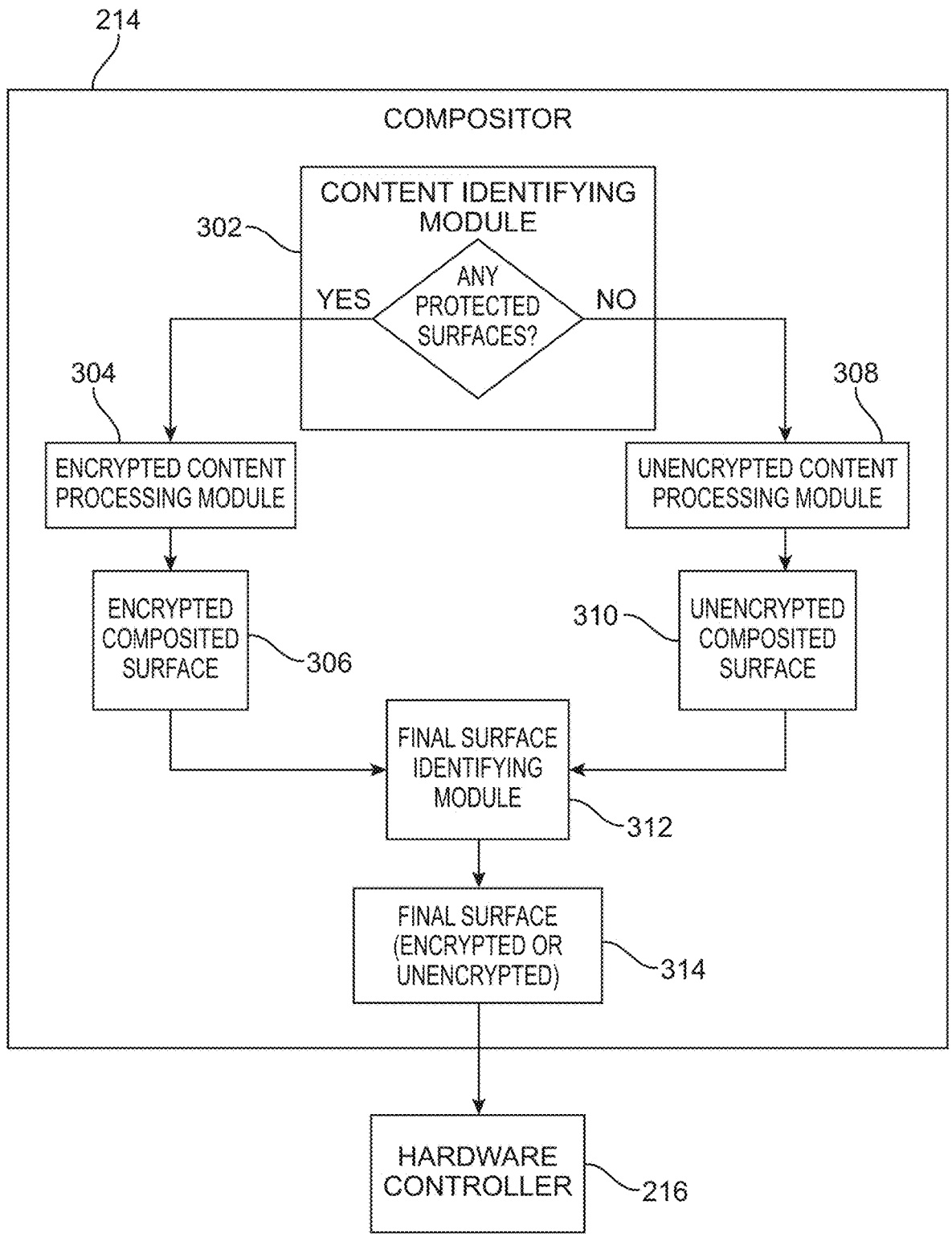
FIG. 3A illustrates a block diagram illustrating a compositor for mapping content to an unprotected or a protected surface of a display device, according to some embodiments.

FIG. 3A illustrates an exemplary block diagram illustrating the compositor 214 for mapping content to an unprotected or a protected surface of a display device according to exemplary embodiments of the present invention. Upon receiving the content component from the shared memory, the compositor 214 may determine the encryption status of the content component (whether the content component includes encrypted content or unencrypted content).

According to various embodiments, the compositor 214 may include a content identifying module 302. Content identifying module may analyze the received content component as well as determine the source providing the content component. For example, the content identifying module 302 may determine an identifier (ID) associated with the content component and/or with the source providing the content component.

If the content identifying module 302 determines that the received content includes encrypted content, the content identifying module 302 passes the processing to the encrypted content processing module 304. The encrypted content processing module 304 may map the encrypted content component to one or more protected surfaces and generate encrypted composited surface 306.

If the content identifying module 302 determines that the received content component includes unencrypted content component, the content identifying module 302 passes the processing to the unencrypted content processing module 308. The unencrypted content processing module 308 may map the encrypted content component to one or more unprotected surfaces and generate unencrypted composited surface 310. The encrypted composited surface 306 and the unencrypted composited surface 310 may be passed to a final surface identifying module 312.

The final surface identifying module 312 may combine the received composited surfaces into a single surface (i.e. protected surface if there is any encrypted content component present, and unprotected surface if there is only unencrypted content component). The compositor 214 may then pass the final surface 314 to the hardware controller 216 for transmission to the display device. The final surface 314 may only include protected surface(s) (e.g. when there is any encrypted content) or unprotected surface(s) (e.g. when there is only unencrypted content). While the content for both the protected surface and the unprotected surfaces may be displayed on the display device, only content from an unprotected surface may be replicated, recorded, stored or otherwise accessed from the display device.

The compositor illustrated in FIG. 3A may be used in connection with embodiments discussed above in connection with FIGS. 1A and 1B.

Figure 3B:
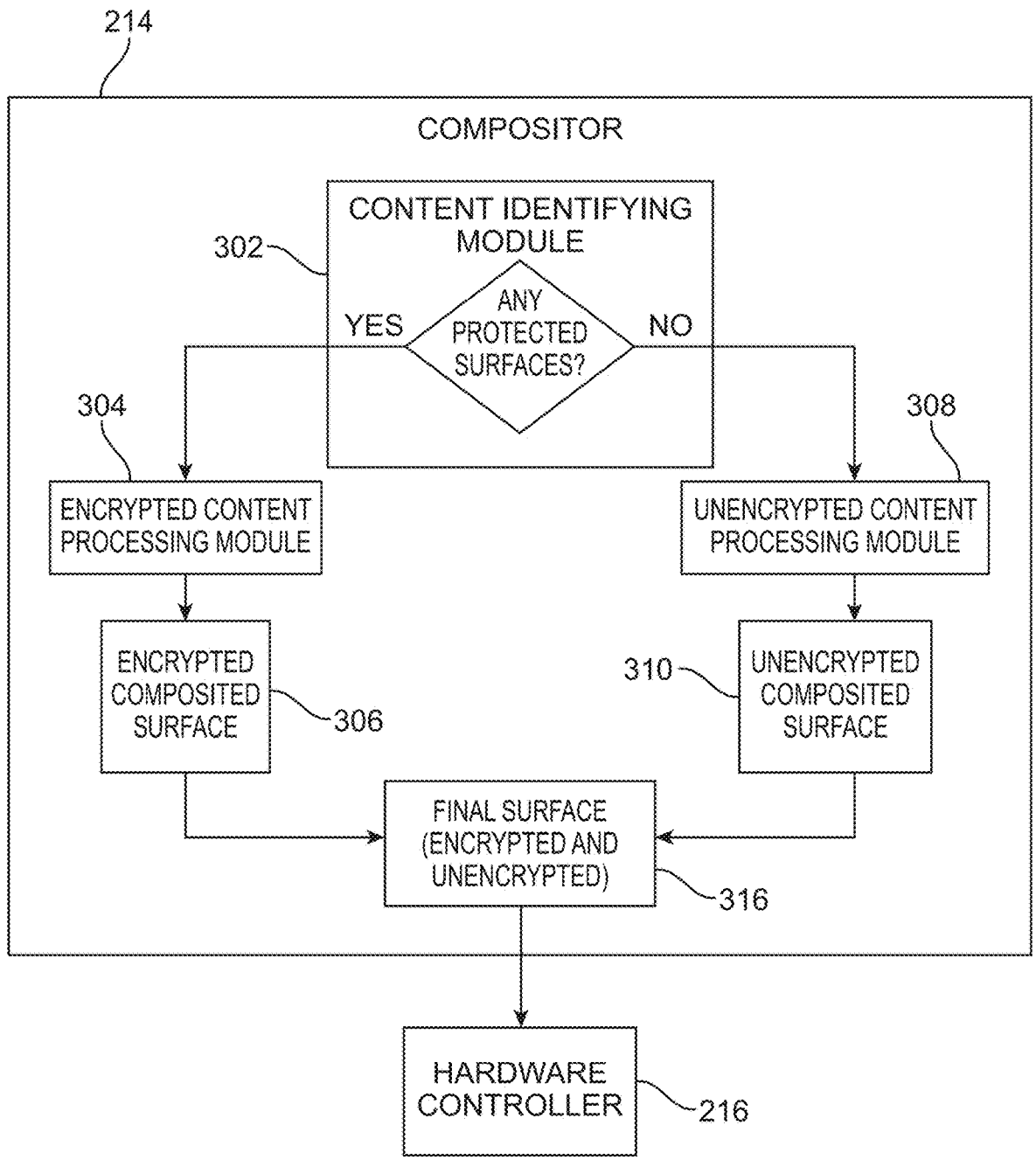
FIG. 3B illustrates a block diagram illustrating a compositor for mapping encrypted content to a protected surface and mapping unencrypted content to an unprotected surface of a display device, according to some embodiments.

As described above, it may also be possible to map encrypted content component to protected surface(s) and unencrypted content component to unprotected surface(s). FIG. 3B illustrates an exemplary block diagram illustrating the compositor for mapping encrypted content component to a protected surface and mapping unencrypted content component to an unprotected surface of a display device according to exemplary embodiments of the present invention.

Upon receiving the content component from the shared memory, the compositor 214 may determine the encryption status of the content component (whether the content is encrypted content, unencrypted content). According to various embodiments, the compositor 214 may include a content identifying module 302. Content identifying module may analyze the received content component as well as determine the source providing the content component. For example, the content identifying module 302 may determine an identifier (ID) associated with the content component and/or with the source providing the content component.

If the content identifying module 302 determines that the received content component includes encrypted content, the content identifying module 302 passes the processing to the encrypted content processing module 304. The encrypted content processing module 304 may map the encrypted content component to one or more protected surfaces and generate encrypted composited surface 306.

If the content identifying module 302 determines that the received content component includes unencrypted content, the content identifying module 302 passes the processing to the unencrypted content processing module 308. The unencrypted content processing module 308 may map the encrypted content component to one or more unprotected surfaces and generate unencrypted composited surface 310.

The encrypted composited surface 306 and the unencrypted composited surface 310 may then be merged into a single final surface 316 including protected surface(s) and unprotected surface(s). The compositor 214 may then pass the final surface 316 to the hardware controller 216 for transmission to the display device. While the content for both the protected surface and the unprotected surfaces may be displayed on the display device, only content from an unprotected surface may be replicated, recorded, stored or otherwise accessed from the display device.

The compositor illustrated in FIG. 3B may be used in connection with embodiments discussed above in connection with FIG. 1C.

Figure 4A:
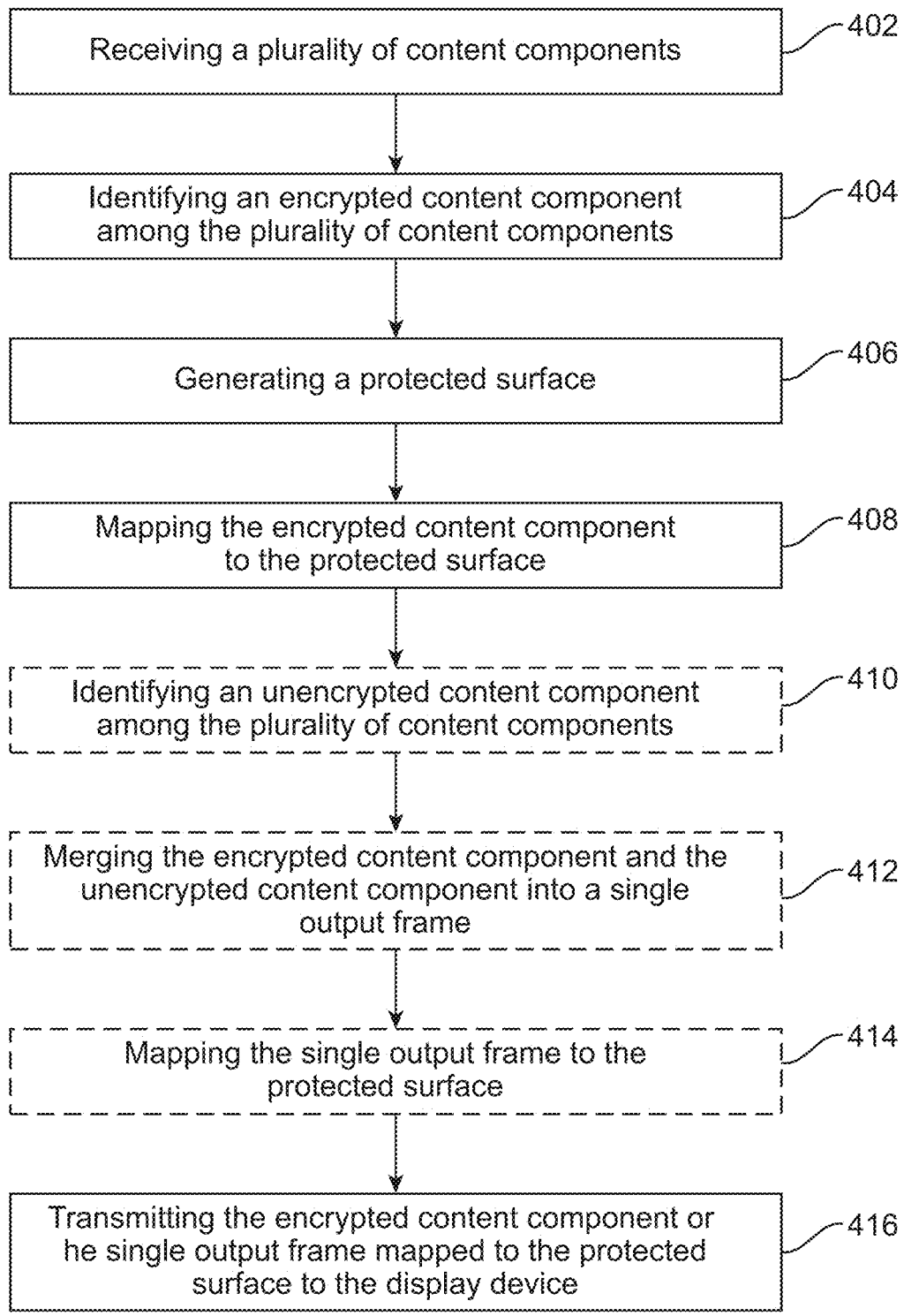
FIG. 4A is a flowchart illustrating a method for displaying encrypted content on a display device, according to some embodiments.

FIG. 4A is a simplified flowchart illustrating a method for displaying encrypted content component on a display device according to some embodiments of the present invention.

At step 402, a processing platform may receive a plurality of content components from one or more sources. According to various embodiments, the sources may provide encrypted content and/or unencrypted content.

At step 404, the platform may identify an encrypted content component among the plurality of content components. For example, the platform may analyze the received content components and determine an identifier associated with the source providing the content component and/or with the content components itself. The platform may determine the encryption status of the content component based on the identifier.

At step 406, the platform may generate a protected surface. The encrypted content component may be configured to be rendered only on the protected surface. The protected surface may include a texture having a predetermined dimension that maps to a field of view on the display device.

At step 408, the platform may map the encrypted content component to the protected surface. The content mapped to the protected surface is rendered on the display device but prevented from being replicated from the display device. According to various embodiments, the platform may disable sharing, recording and/or storing features of the processing platform with respect to the protected surface.

In some embodiments, the plurality of content components may also include unencrypted content components. At optional step 410, the platform may identify an unencrypted content component among the plurality of content components. The platform may then merge the encrypted content component and the unencrypted content component into a single output frame (step 412). Based on the presence of the encrypted content, the platform may then map the single output frame to the protected surface. Such that, when the encrypted content component and the unencrypted content component are transmitted to a display device, both contents are mapped to the protected surface on the display device. Accordingly, both contents will be protected from being replicated from the display device.

According to various embodiments, the encrypted content source may provide at a first timeline, the unencrypted content source may provide at a second timeline, and the platform may generate at third timeline with the generated single frames using the content components from the encrypted content source and the unencrypted content source. According to various embodiments, the third timeline may be based on a refresh rate of the compositor.

At step 416, the platform may transmit the encrypted content component or the single output frame mapped to the protected surface to the display device. The encrypted content component or the single output frame is rendered on the protected surface on the display device.

According to various embodiments, upon receiving the plurality of component components, the platform may create a plurality of frame loops. Each frame loop may correspond to one of the plurality of content components. The platform may then queue the plurality of frame loops into a frame loop pipeline, and obtain a frame loop from the frame loop pipeline. The platform may be able to determine whether the frame loop corresponds to the encrypted content component or an unencrypted content component based on a source of the plurality of component components.

Figure 4B:
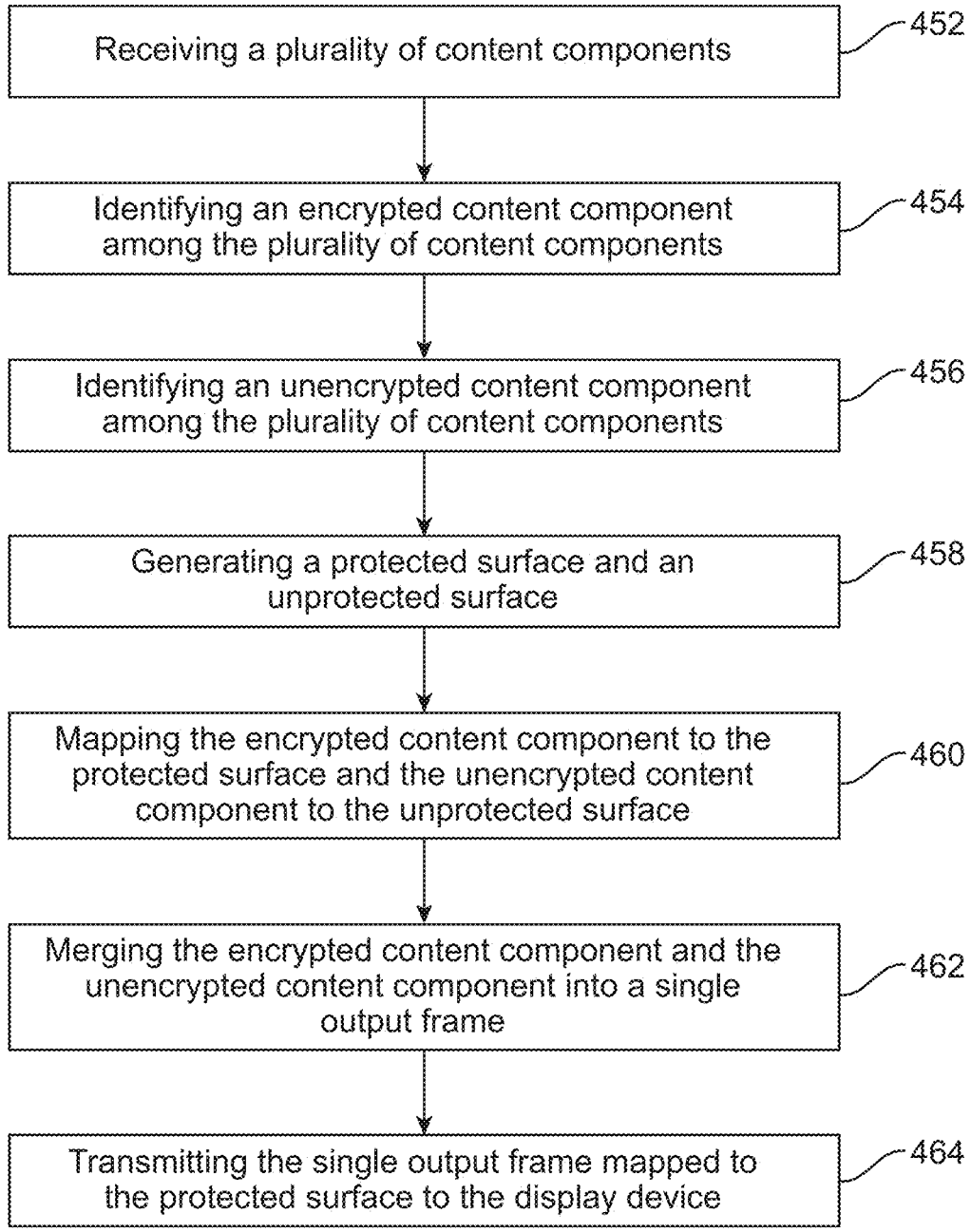
FIG. 4B is a flowchart illustrating a method for displaying encrypted content and unencrypted content on a display device, according to some embodiments.

FIG. 4B is a simplified flowchart illustrating a method for displaying encrypted content component and unencrypted component on a display device according to some embodiments of the present invention.

At step 452, a processing platform may receive a plurality of content components from one or more sources. According to various embodiments, the sources may provide encrypted content and/or unencrypted content.

At steps 454 and 456, the platform may identify an encrypted content component and an unencrypted content component, respectively, among the plurality of content components. For example, the platform may analyze the received content components and determine an identifier associated with the source providing the content component and/or with the content components itself. The platform may determine the encryption status of the content component based on the identifier.

At step 458, the platform may generate at least one protected surface and at least one unprotected surface. The encrypted content component may be configured to be rendered only on the protected surface.

At step 460, the platform may map the encrypted content component to the protected surface and map the unencrypted content component to the unprotected surface. The content mapped to the protected surface may be rendered on the display device, but prevented from being replicated. According to various embodiments, the platform may disable sharing, recording and/or storing features of the processing platform with respect to the protected surface.

At step 462, the platform may merge the encrypted content component and the unencrypted content component into a single output frame.

At step 464, the platform may transmit the single output frame to the display device. The encrypted content component is then rendered on the protected surface on the display device, and the unencrypted content component is rendered on the unprotected surface on the display device. Accordingly, while the encrypted content cannot be replicated from the display device, the unencrypted content can be replicated from the display device.

According to various embodiments, prior to transmitting the single output frame to the display device, the platform may allocate the encrypted content component to the protected surface on the display device and the unencrypted content component to the unprotected surface on the display device. In some embodiments, the protected surface and the unprotected surface may map to mutually exclusive fields of view on the display device. In other embodiments, the protected surface and the unprotected surface map to two fields of view that overlap on the display device, the overlap between the fields of view may be displayed on a protected surface on the display device.

System Architecture Overview

Figure 5:
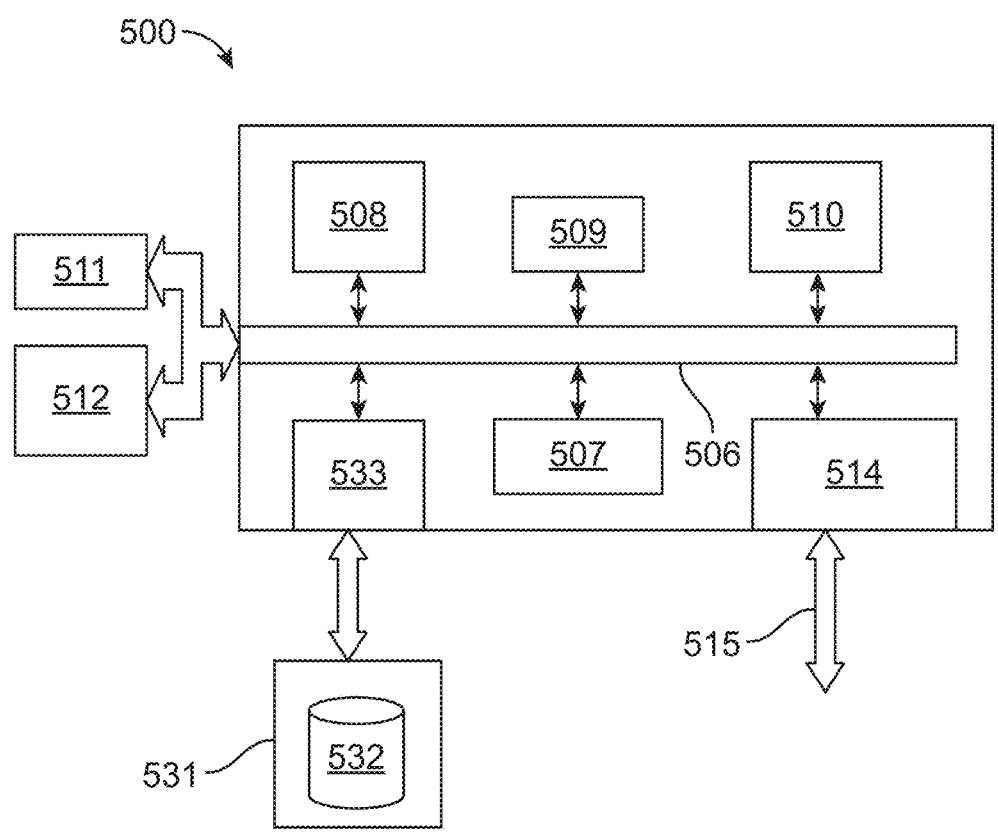
FIG. 5 is a block diagram schematically depicting an illustrative computing system, according to some embodiments.

FIG. 5 is a block diagram of an illustrative computing system 500, according to some embodiments. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512, and cursor control.

According to some embodiments, computer system 500 performs specific operations by processor 507 executing one or more sequences of one or more instructions contained in system memory 508. Such instructions may be read into system memory 508 from another computer readable/usable medium, such as static storage device 509 or disk drive 510.

In alternative embodiments, hard-wired circuitry may be used in place of or in combination with software instructions to implement the disclosure. Thus, embodiments are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In some embodiments, execution of the sequences of instructions to practice the disclosure is performed by a single computer system 500. According to some embodiments, two or more computer systems 500 coupled by communication link 515 (e.g., LAN, PTSN, or wireless network) may perform the sequence of instructions required to practice the disclosure in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. Database 532 in storage medium 531 may be used to store data accessible by system 500 via data interface 533.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A head-mounted display system configured to display augmented reality image content, the head-mounted display system comprising:
   a display comprising a protected surface:
   one or more processors; and
   one or more memory storing instructions that, upon execution by the one or more processors, configure the head-mounted display system to:
      receive, from a source, a plurality of content components that includes an encrypted content component;
      transmit, to a compositor, the plurality of content components;
      receive, from the compositor, the encrypted content component mapped to the protected surface within a field of view associated with the head-mounted display system at least based on the content component being encrypted; and
      display the encrypted content component on the protected surface of the display, wherein the encrypted content component is simultaneously viewable on the protected surface of the display and the source.

2. The head-mounted display system of claim 1, wherein the display comprises at least two protected surfaces.

3. The head-mounted display system of claim 2, wherein at least one of the two protected surfaces comprises at least one of: (i) the encrypted content component or (ii) an unencrypted content component.

4. The head-mounted display system of claim 2, wherein the plurality of content components includes an unencrypted content component, and wherein the instructions further configure the head-mounted display system to:
receive, from the compositor, the unencrypted content component mapped to an unprotected surface of the display and within the field of view associated with the head-mounted display system; and
display the encrypted content component on the unprotected surface of the display, wherein the unencrypted content component is simultaneously viewable on the display and the source.

5. The head-mounted display system of claim 4, wherein the encrypted content component and the unencrypted content component are rendered on the display and are prevented from being replicated from the display.

6. The head-mounted display system of claim 5, wherein replication is prevented through at least one of: scrambling, distorting, redacting, or using an alternative content.

7. The head-mounted display system of claim 4, wherein at least a portion of the encrypted content component and the unencrypted content component is rendered on the display, wherein the unencrypted content component is configured to be replicated from the display, and wherein the encrypted content component is prevented from being replicated from the display.

8. The head-mounted display system of claim 7, wherein replicating content includes at least one of: (i) recording the content or (ii) storing the content.

9. The head-mounted display system of claim 1, wherein the plurality of content components received from the source include at least one of: (i) audio content, (ii) video content, (iii) textual content, or (iv) image content.

10. The head-mounted display system of claim 1, wherein the instructions further configure the head-mounted display system to:
receive a single output frame from the compositor, wherein the single output frame is mapped to one or more protected surfaces on the display.

11. The head-mounted display system of claim 1, wherein the instructions further configure the head-mounted display system to:
receive the protected surface from the compositor, wherein the encrypted content component is configured to be rendered only on the protected surface; and
render the encrypted content component on the protected surface.

12. The head-mounted display system of claim 1, wherein the instructions further configure the head-mounted display system to:
upon receiving the plurality of content components,
create a plurality of frame loops, wherein each frame loop corresponds to one of the plurality of content components; and
queue the plurality of frame loops into a frame loop pipeline.

13. A method for displaying content components on a head-mounted display, the method comprising:
receiving, from at least one source, a plurality of content components, the plurality of content components including at least one protected content component;
transmitting, to a compositor, the plurality of content components;
receiving, from the compositor, a protected surface within a field of view associated with the head-mounted display at least based on being the compositor mapping the protected content component to the protected surface; and
displaying the protected content component on the protected surface of the display, wherein the protected content component is simultaneously viewable on the protected surface of the display and the source.

14. The method of claim 13, further comprising:
receiving a single output frame from the compositor, wherein the single output frame is mapped to one or more protected surfaces on the head-mounted display.

15. The method of claim 13, further comprising:
receiving the protected surface from the compositor, wherein the protected content component is configured to be rendered only on the protected surface; and
rendering the protected content component on the protected surface.

16. The method of claim 13, further comprising:
upon receiving the plurality of content components,
creating a plurality of frame loops, wherein each frame loop corresponds to one of the plurality of content components; and
queuing the plurality of frame loops into a frame loop pipeline.

17. The method of claim 13, wherein the protected surface and an unprotected surface map to mutually exclusive fields of view on the head-mounted display.

18. The method of claim 13, wherein the protected surface and an unprotected surface map to two fields of view that overlap on the head-mounted display, wherein the overlap between the fields of view is within the field of view associated with the head-mounted display and is displayed as protected content on the head-mounted display such that while the protected content component is rendered on the head-mounted display, the protected content component is prevented from being replicated from the head-mounted display.

19. The method of claim 13, wherein protected content mapped to the protected surface is rendered on the head-mounted display and is prevented from being replicated from the head-mounted display.

20. A non-transitory computer-readable medium storing a set of instructions, the set of instructions when executed by one or more processors of a head-mounted display system cause processing to be performed comprising:
receiving, from a source, a plurality of content components that includes an encrypted content component;
transmitting, to a compositor, the plurality of content components;
receiving, from the compositor, the encrypted content component mapped to a protected surface within a field of view associated with a head-mounted display system at least based on the content component being encrypted, wherein the protected surface is provided on a display of the head-mounted display system; and
displaying the encrypted content component on the protected surface of the display, wherein the encrypted content component is simultaneously viewable on the protected surface of the display and the source.

* * * * *